United States Patent
Beach

(10) Patent No.: US 11,117,263 B2
(45) Date of Patent: Sep. 14, 2021

(54) METHOD AND APPARATUS FOR LABELING OF SUPPORT STRUCTURES

(71) Applicant: Zebra Technologies Corporation, Lincolnshire, IL (US)

(72) Inventor: Robert E. Beach, Los Altos, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 339 days.

(21) Appl. No.: 16/189,790

(22) Filed: Nov. 13, 2018

(65) Prior Publication Data

US 2020/0147803 A1 May 14, 2020

(51) Int. Cl.
*B25J 9/16* (2006.01)
*B65C 9/40* (2006.01)
*B25J 11/00* (2006.01)
*B25J 19/02* (2006.01)

(52) U.S. Cl.
CPC ............ *B25J 9/1697* (2013.01); *B25J 9/162* (2013.01); *B25J 11/00* (2013.01); *B25J 19/021* (2013.01); *B65C 9/40* (2013.01)

(58) Field of Classification Search
CPC . B25J 9/1697; B25J 9/162; B25J 11/00; B25J 19/021; B65C 9/40; B65C 2009/0043; B65C 2009/0046
See application file for complete search history.

(56) References Cited

U.S. PATENT DOCUMENTS

| 5,423,617 A * | 6/1995 | Marsh | A47F 10/02 400/82 |
| 2009/0314413 A1* | 12/2009 | Brandow | B65B 61/26 156/64 |
| 2019/0389078 A1* | 12/2019 | Bartlett | B25J 5/007 |

FOREIGN PATENT DOCUMENTS

WO WO-2017187106 A1 * 11/2017 ............ B25J 13/085

OTHER PUBLICATIONS

Current claims set for U.S. Appl. No. 16/189,783.*

* cited by examiner

*Primary Examiner* — Khoi H Tran
*Assistant Examiner* — Nhi Q Bui
(74) *Attorney, Agent, or Firm* — Yuri Astvatsaturov

(57) ABSTRACT

An apparatus for labeling support structures includes: a chassis having a locomotive assembly, and supporting an effector assembly with an end movable relative to the chassis and carrying a label modification unit with an image sensor; a controller coupled to the locomotive assembly, effector assembly and label modification unit, and configured to: obtain label modification data defining a location relative to a support structure reference feature for a label modification operation; control the locomotive assembly to travel to the support structure; detect the reference feature via image data captured at the image sensor; control the effector assembly to place the label modification unit at the location relative to the reference feature; control the effector assembly and the label modification unit perform the label modification operation.

12 Claims, 12 Drawing Sheets

METHOD AND APPARATUS FOR LABELING OF SUPPORT STRUCTURES

BACKGROUND

Environments in which inventories of objects are managed, such as products for purchase in a retail environment, may be complex and fluid. A retail facility may contain a wide variety of products disposed on support structures such as shelves, which bear labels containing product information such as prices, barcodes and the like. The modification of products within the facility, the selection of products on the shelves, and the formatting of the labels, may all change over time, requiring previous labels to be replaced with new labels. The modification of labels is typically performed manually, in a time-consuming and error-prone process. Similar issues may be present in other environments in which inventoried objects are managed, such as in warehouse environments.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
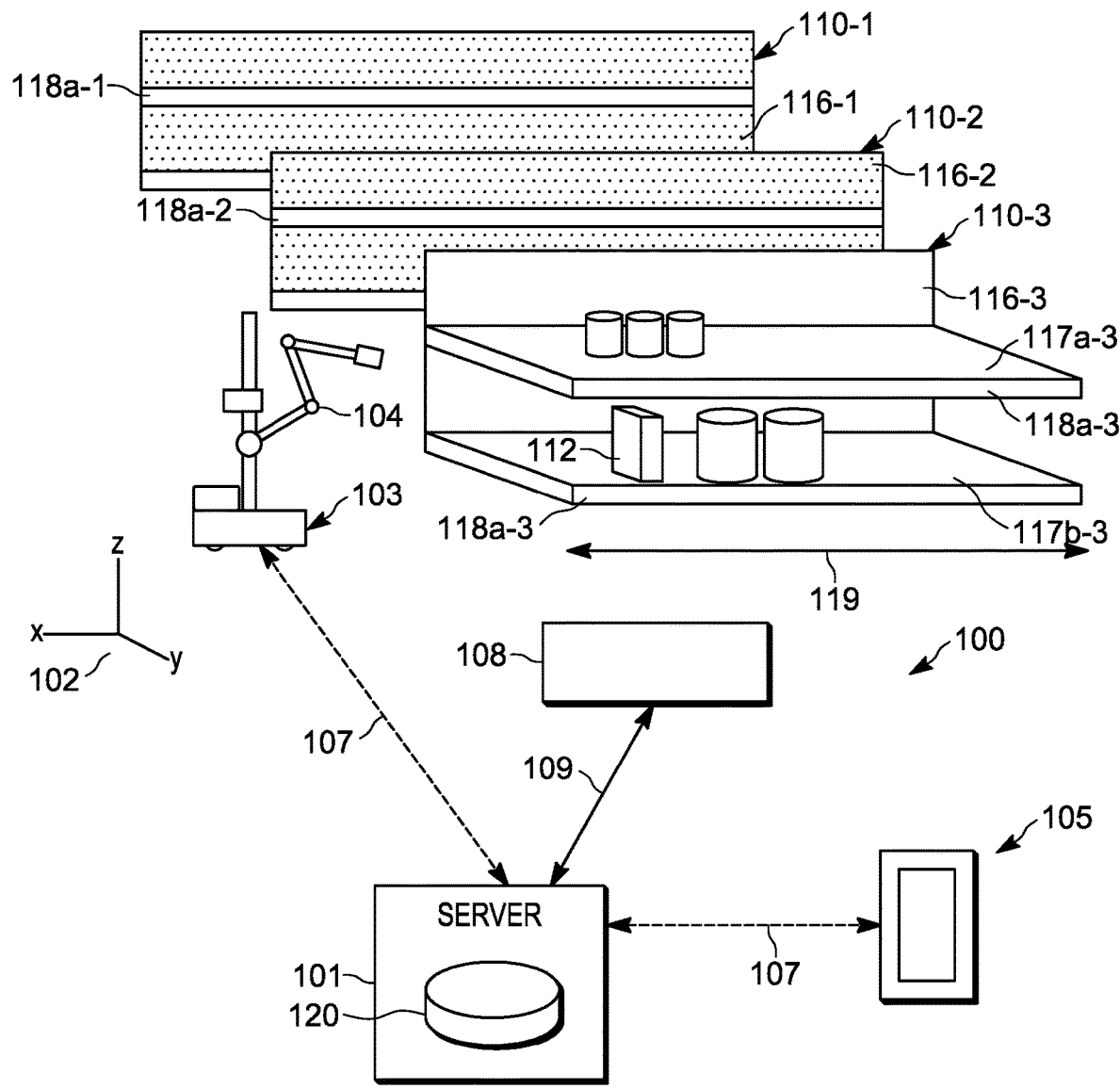
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to an apparatus for labeling support structures. The apparatus includes a chassis having a locomotive assembly; an effector assembly having a first end coupled to the chassis and a second end movable relative to the chassis; a label modification unit at the second end of the effector assembly, the label modification unit including an image sensor; and a controller coupled to the locomotive assembly, the effector assembly and the label modification unit. The controller is configured to obtain label modification data defining a location relative to a reference feature on a support structure for a label modification operation; control the locomotive assembly to travel to the support structure; detect the reference feature via image data captured at the image sensor; control the effector assembly to place the label modification unit at the location relative to the reference feature; and control the effector assembly and the label modification unit to perform the label modification operation.

Additional examples disclosed herein are directed to a method for labeling support structures, comprising: at a controller of an apparatus: obtaining label modification data defining a location relative to a reference feature on a support structure for a label modification operation; controlling a locomotive assembly of the apparatus to travel to the support structure; detecting the reference feature in an image captured at an image sensor of the apparatus; controlling an effector assembly of the apparatus to place the label modification unit at the location relative to the reference feature; and controlling the label modification unit to perform the label modification operation.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points (not shown). In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link. As those of ordinary skill in the art will realize, alternatively or in addition to the retail environment, embodiments of the present disclosure may be implemented in a variety of environments in which inventoried objects are managed, such as in a warehouse environment.

The client computing device 105 is illustrated in FIG. 1 as a mobile computing device, such as a tablet, smart phone or the like. In other examples, the client device 105 is implemented as another type of computing device, such as a desktop computer, a laptop computer, another server, a kiosk, a monitor, and the like. The system 100 can include a plurality of client devices 105 in communication with the server 101 via respective links 107.

The system 100 is deployed, in the illustrated example, in a retail environment including a plurality of support structures in the form of shelf modules 110-1, 110-2, 110-3 and so on (collectively referred to as shelf modules 110, and generically referred to as a shelf module 110—this nomenclature is also employed for other elements discussed herein). Various other support structures for supporting inventoried retail and/or warehouse items disposed thereon are contemplated, including shelves, racks (including racks for hanging inventoried objects, such as clothing racks), peg boards, and the like.

Each shelf module 110 supports a plurality of products 112. Each shelf module 110 includes a shelf back 116-1, 116-2, 116-3 and one or more support surfaces (e.g. an upper support surface 117a-3 and a lower support surface 117b-3 as illustrated in FIG. 1) extending from the shelf back 116 to a respective shelf edge (e.g. shelf edges 118a-1, 118a-2, 118a-3 and 118b-3). The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. The shelf edges 118 typically bear labels corresponding to the products 112 and therefore including information such as product names, barcodes or other machine-readable indicators, prices, and the like.

The labels can include adhesive labels affixed to the shelf edges 118, labels recorded or written on a rewriteable medium supported on the shelf edge 118 (e.g. by adhesives or the like), or other suitable labels. In the discussion below, labels are recorded on rewriteable media supported on the shelf edges 118. In some examples, a piece (e.g. a strip) of rewriteable medium may extend across the shelf edge 118, or a portion thereof, and contain multiple labels corresponding to respective products 112. In other examples, the shelf edge 118 may support multiple rewriteable media in the form of discrete rewriteable labels corresponding to respective products. In other words, the term "label" as employed herein can refer to either a discrete piece of rewritable medium, or to a region of a strip of rewritable medium that defines several such regions (i.e. several labels). The rewriteable media may be for example a photothermal material having a first color, which, upon heating to a first threshold temperature, changes to and maintains a second color (i.e. writing on the rewriteable medium), and upon heating to a second threshold temperature, reverts to and maintains the first color (i.e. erasing the rewriteable medium). For example, the second color can be black, grey or the like, while the first color can be substantially white. More generally, the first color and the second color contrast with one another.

As will be apparent from FIG. 1, the term "shelf edge" 118 as employed herein, which may also be referred to as the edge of a support surface of a support structure (e.g., the support surfaces 117) refers to a surface bounded by adjacent surfaces having different angles of inclination. In the example illustrated in FIG. 1, the shelf edges 118a-3 is at an angle of about ninety degrees relative to each of the support surface 117a-3 and the underside (not shown) of the support surface 117a-3. In other examples, the angles between the shelf edges 118 and the adjacent surfaces, such as the support surfaces 117, is more or less than ninety degrees.

In the illustrated embodiment, the apparatus 103 is deployed within the retail environment, and communicates with the server 101 (e.g. via the link 107) to navigate, autonomously or partially autonomously, along a length 119 of at least a portion of the shelf modules 110. The apparatus 103 is configured to navigate among the shelf modules 110, for example according to a frame of reference 102 established within the retail environment. The frame of reference 102 can also be referred to as a global frame of reference. The apparatus 103 is configured, during such navigation, to track the location of the apparatus 103 relative to the frame of reference 102. In other words, the apparatus 103 is configured to perform localization. The apparatus 103 is equipped with one or more navigation sensors, including but not limited to image sensors, depth sensors, as well as gyroscopes and/or accelerometers, enabling the apparatus 103 to navigate within the environment.

The apparatus 103 also includes an effector assembly 104 bearing a label modification unit, to be discussed in greater detail below. The apparatus 103 is configured, for example responsive to commands received from the server 101, to navigate among the shelf modules 110 and modify the above-mentioned labels on the shelf edges 118 with the effector assembly 104 and associated components. For example, certain labels may require periodic modification to reflect updated prices, reallocation of products 112 among the shelf modules 110, and the like. The server 101 includes a memory storing a repository 120 containing label modification data, for example in the form of a planogram indicating the locations (e.g. in the frame of reference 102) of each shelf module 110, as well as the location of each label on each shelf module. Label locations may be expressed in the repository as a distance along a specified shelf edge 118 relative to a reference feature of the module 110, such as the boundary of the module 110 (e.g. the left side of the module 110). The label modification data in the repository 120 can also contain further data defining each label, such as the label type (i.e. the physical format of the label), the label content (e.g. as formatted sequences indicating font size, font type, value, location, etc., or as a bit map), the arrangement of the label content within the label, the product identifier corresponding to the label, and the like.

Figure 2A:
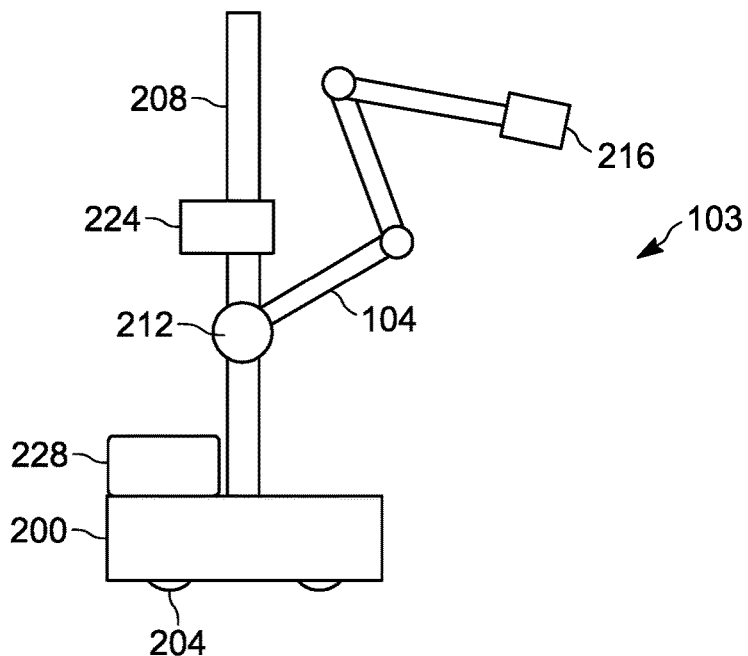
FIG. 2A depicts a mobile automation apparatus in the system of FIG. 1.
Figure 2B:
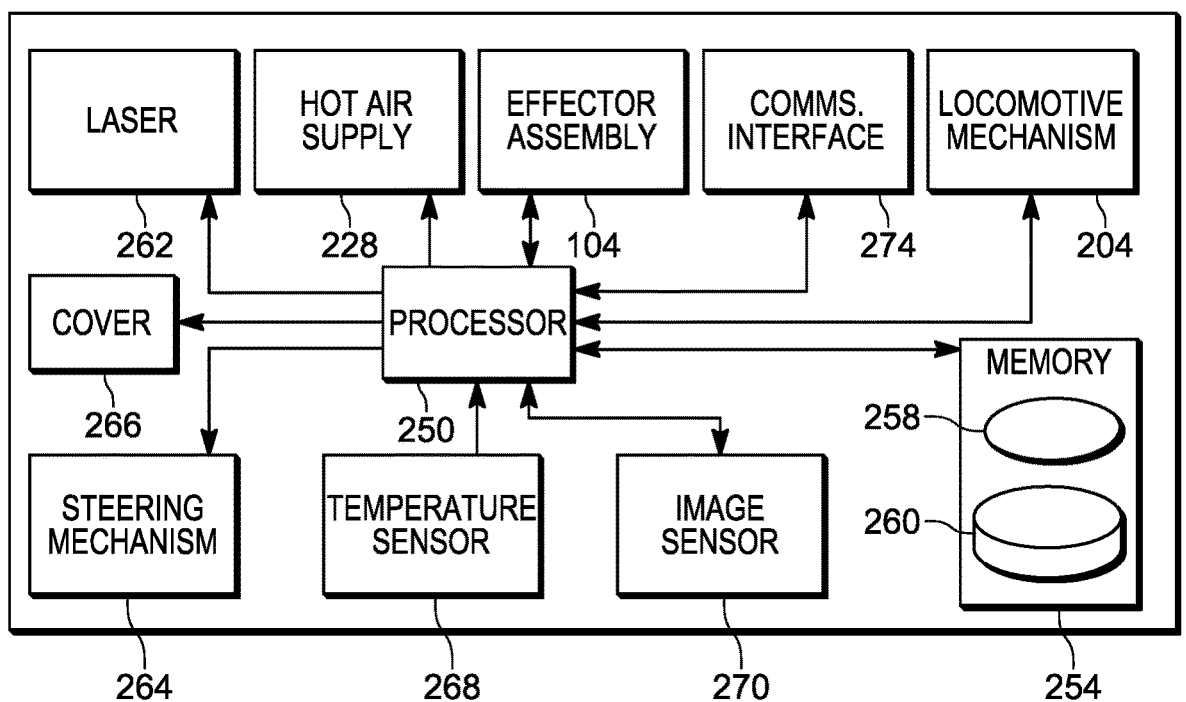
FIG. 2B is a block diagram of certain internal components of the mobile automation apparatus in the system of FIG. 1.

Turning now to FIGS. 2A and 2B, the mobile automation apparatus 103 is shown in greater detail. Referring to FIG. 2A, the apparatus 103 includes a chassis 200 containing a locomotive mechanism 204 (e.g. one or more electrical motors driving wheels, tracks or the like). The chassis 200 supports additional components of the apparatus 103, including a mast 208 which in turn supports the effector assembly 104. The effector assembly 104, in the present example, is a robotic arm fixed to the chassis 200 (via the mast 208) at a first end 212. A second end of the effector assembly 104 is movable relative to the chassis 200, for example with six degrees of freedom (e.g. translations in three dimensions, as well as roll, pitch and yaw angles). The second end of the effector assembly 104 carries a label modification unit 216. As will be discussed in greater detail below, the label modification unit 216 is configured to perform label modification operations, such as erasing and writing label content, as well as to capture data (e.g. image data) for use in positioning the modification unit 216 via control of the effector assembly 104.

The apparatus 103 also includes a hot air supply 228 configured to supply hot air to the modification unit 216 for application to the rewriteable medium to erase label content from the rewriteable medium. The hot air supply 228 can be implemented as a plurality of distinct components. For example, the hot air supply 228 can be implemented as one or more pumps and associated storage tanks (e.g. air storage tanks) to supply air via an air conduit extending through a portion of the mast 208 and the effector assembly 104 to the label modification unit 216, as well as a heater (e.g. an inline heater within one or both of the mast 208 and the effector assembly 104) mounted within the air conduit to heat the air. In other examples, additional label erasing mechanisms, such as a heated surface for application to the rewriteable medium, can be deployed via the apparatus 103 in addition to or instead of the hot air supply 228, depending on the nature of the rewriteable medium.

The apparatus 103 also includes components for controlling and interacting with the above components to modify labels on the shelf edges 118. Turning to FIG. 2B, the apparatus 103 includes a special-purpose controller, such as a processor 250 interconnected with a non-transitory computer readable storage medium, such as a memory 254. The memory 254 includes a combination of volatile memory (e.g. Random Access Memory or RAM) and non-volatile memory (e.g. read only memory or ROM, Electrically Erasable Programmable Read Only Memory or EEPROM, flash memory). The processor 250 and the memory 254 each comprise one or more integrated circuits.

The memory 254 stores computer readable instructions for execution by the processor 250. In particular, the memory 254 stores a control application 258 which, when executed by the processor 250, configures the processor 250 to perform various functions discussed below in greater detail and related to the navigation of the apparatus 103 (e.g. by controlling the locomotive mechanism 204). The application 258 may also be implemented as a suite of distinct applications in other examples. The processor 250, when so configured by the execution of the application 258, may also be referred to as a controller 250. Those skilled in the art will appreciate that the functionality implemented by the processor 250 via the execution of the application 258 may also be implemented by one or more specially designed hardware and firmware components, such as field-configurable gate arrays (FPGAs), application-specific integrated circuits (ASICs) and the like in other embodiments.

The memory 254 also stores a repository 260 containing, for example, a map of the environment in which the apparatus 103 is deployed, for use in navigation among the shelf modules 110. The apparatus 103 may communicate with the server 101, for example to receive instructions to navigate to specified locations (e.g. to a given aisle consisting of a set of modules 110) and initiate label modification operations. Navigation to the specified module 110 is implemented by the apparatus 103 based in part on the above-mentioned map. The repository 260 can also contain label modification data (e.g. received from the server 101) for use in modifying labels on the shelf modules 110.

As shown in FIG. 2B, the processor 250 is connected to the effector assembly 104, the locomotive mechanism 204, and the hot air supply 228. The processor 250 is enabled, via such connections, to issue commands to the effector assembly 104 to control the position of the label modification unit 216 relative to the chassis 200, and to enable the hot air supply 228 to supply hot air for application at the modification unit 216.

In addition, the apparatus 103 includes a laser 262, a steering mechanism 264, and an image sensor 270 connected to the processor 250 implemented as components of the modification unit 216.

The laser 262 is configured to emit a laser beam. The steering mechanism 264 is configured to steer the laser beam directed at the rewriteable medium for erasing and writing label content on the rewriteable medium. The steering mechanism 264 can be directly connected to the laser 262, a steerable mirror (e.g. configured to reflect the laser beam), or the like. The laser 262 and the steering mechanism 264 are controllable by the processor 250 to cooperate to emit a laser beam in a direction towards the rewriteable medium to modify labels thereon. In particular, the laser 262 is controllable by the processor 250 to emit a laser beam at a first power level for heating the rewriteable medium to a first threshold temperature (e.g. about 180° C., although the first threshold temperature may be above or below 180° C. according to the particular type or formulation of the rewritable medium) to write content on the rewriteable medium and to emit a laser beam at a second power level for heating the rewriteable medium to a second threshold temperature (e.g. about 130° C. to about 170° C., although the second threshold temperature may be above 170° C. or below 130° C., according to the particular type or formulation of the rewritable medium) to erase content on the rewriteable medium. In other examples, the processor 250 may control the focus, shape or the like of the laser beam, for example to heat a larger area at a lower temperature for erasing, and to heat a smaller area at a higher temperature for writing. In some examples, the hot air supply 228 can be omitted, and the laser 262 can be used for both writing and erasing, while in other examples, the laser can be used only for writing and the hot air supply 228 for erasing. In still further examples, the laser 262 can be used for writing, and the apparatus 103 can select a removal mechanism from the laser 262 and the hot air supply 228 according to the erasing operation.

The image sensor can be for example a digital color camera (e.g. configured to generate RGB images), a greyscale camera, an infrared camera, an ultraviolet camera or a combination of the above. The image sensor 270 is controllable by the processor 250 to capture images of the shelf modules 110 in order to locate the modification unit 216 and modify labels on the shelf edges 118.

The apparatus 103 can also include a cover 266 and a temperature sensor 268 connected to the processor 250 and implemented as components of the modification unit 216.

The cover 266 is sized to fully block an opening of the modification unit 216 to prevent a laser beam emitted by the laser 262 from leaving the modification unit 216. The cover 266 is movable between a closed position to fully block the opening and an open position to fully open the opening. In particular, the cover 266 is controllable by the processor 250 for example via an electromagnetic, servo, or linear motor or the like to selectively block at least a portion of the opening to define an operational portion of the opening through which the laser 262 may emit a laser beam. When the cover 266 partially blocks the opening, laser beams emitted by the laser 262 are restricted to being directed through the operational portion of the opening; laser beams directed to other portions of the opening than the operational portion are obstructed from reaching the environment by the cover 266.

The temperature sensor 268 may for example be mounted within the modification unit 216 or within an air conduit running between the hot air supply 228 and the modification unit 216. The temperature sensor 268 is configured to provide temperature measurements to the processor 250, and the processor 250 is configured to detect, based at least in part on comparing the temperature measurements to a predetermined temperature threshold required to erase the label, whether a label has been erased by the modification unit 216.

The apparatus 103 also includes a communications interface 274 enabling the apparatus 103 to communicate with other computing devices, such as the server 101 over the link 107 shown in FIG. 1. The communications interface 274 also enables the apparatus 103 to communicate with the server 101 via the dock 108 and the link 109.

Figure 3A:
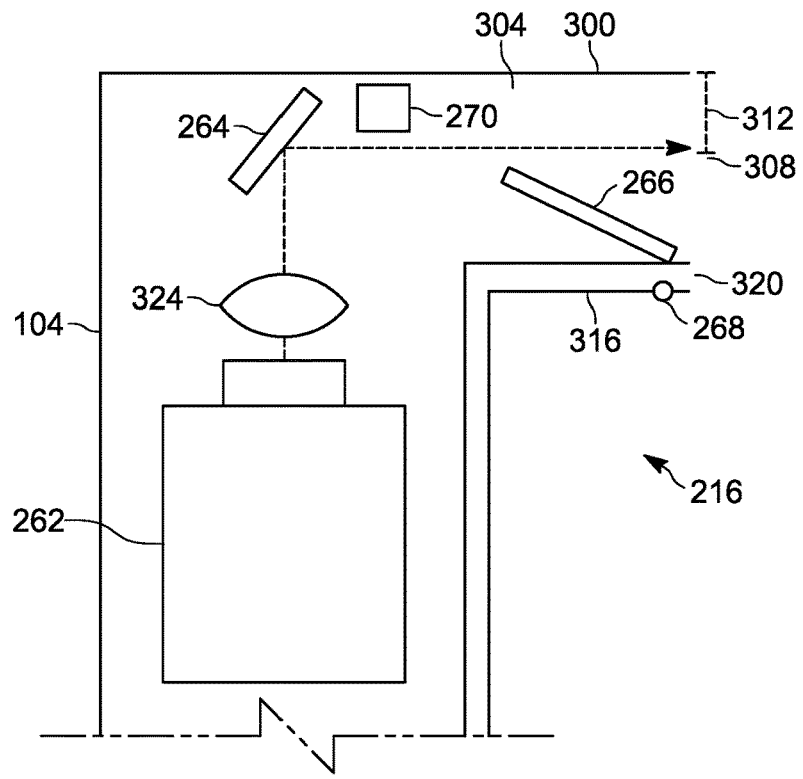
FIG. 3A is a side view of a label modification unit of the mobile automation apparatus in the system of FIG. 1.

Turning to FIG. 3A, the modification unit 216 is shown in greater detail. In particular, FIG. 3A illustrates a side view of the modification unit 216, when the modification unit 216 is oriented to erase or write content on a rewriteable medium on a shelf edge 118.

The modification unit 216 includes a housing 300 defining a cavity 304 and an opening 308 at the front of the modification unit 216, the front being the portion of the modification unit 216 configured to face and/or contact the shelf edge 118.

The modification unit 216 also includes the cover 266. As shown in FIG. 3A, the cover 266 is in a partially open position and partially blocks the opening 308. The cover 266 defines an operational portion 312 of the opening 308, which is smaller than the opening 308. In the present example, the cover 266 extends from the bottom of the housing 300. In other examples, the cover 266 may extend from the top or either side of the housing 300. In some examples, the modification may include multiple covers 266 which cooperate to define horizontal and vertical dimensions of the operational portion 312. The cover 266 is configured to be movable from the closed position to the open position such that it does not interfere with positioning the modification unit 216 at or near the shelf edge 118. For example, as shown in FIG. 3A, the cover 266 is configured to move from the open position to the closed position within the cavity 304. In operation, the cover(s) 266 are configured to at least partially block the opening 308, with the operational portion 312 of the opening 308 being filled by the label being modified. The cover(s) 266 therefore prevent the laser beam from inadvertently reaching areas of the environment other than the rewriteable medium. The modification unit 216 can also include a biasing means, such as a spring, to bias the cover 266 to fully block the opening 308 (i.e. towards the closed position) when the cover 266 is not actively controlled by the processor 250. In the closed position shown in FIG. 3B, the cover 266 fully blocks the opening 308 and prevents the laser 262 from inadvertently reaching the environment, for example when the apparatus 103 is moving.

Also shown in FIG. 3A are the laser 262 and the steering mechanism 264 disposed in the cavity 304. In the present example, the steering mechanism 264 is a steerable mirror configured to reflect the laser beam emitted by the laser 262 towards the opening 308, and more particularly, through the operational portion 312.

FIG. 3A also depicts the image sensor 270 disposed in the cavity 304. The image sensor 270 is oriented to capture images depicting portions of the environment toward which the modification unit 216 is currently oriented (i.e. through the opening 308). More particularly, the image sensor 270 captures images depicting portions of the environment visible through the operational portion 312.

Also shown in FIG. 3A is an air conduit 316 connecting the hot air supply 228 with the modification unit 216. The air conduit 316 is shown as being disposed on an exterior surface of the effector assembly 104, but in other embodiments can be disposed within the effector assembly 104. The conduit 316 is configured to transmit hot air from the hot air supply 228 to the modification unit 216 for use in modifying, and particularly erasing, the rewriteable medium. The conduit 316 includes the temperature sensor 268 mounted therein. The temperature sensor 268 is configured to provide temperature measurements of the hot air to the processor 250 to determine whether the hot air has reached the requisite temperature to heat and erase the label. For example, the requisite temperature of the hot air may be about 170° C. to heat the label to the second threshold temperature of about 130° C. to about 170° C. for erasing the rewriteable medium.

In the present example, the air conduit 316 terminates in an outlet 320 at or near the front of the modification unit 216. Hot air may be applied to the rewriteable medium via the outlet 320. In other examples, the modification unit 216 can include structural features (e.g. a vent at the outlet, ridges on a front side of the cover 266 or the modification unit 216, a hollow cover 266 having venting apertures on a front side) configured to diffuse airflow of the hot air across the rewriteable medium to increase efficiency of erasing. In further examples, the hot air supply 228 may be integrated with the cover 266, for example by integrating a heating element with the cover 266 to heat the air as it flows through or near the cover 266. For example, the cover 266 can include a heating wire, such as a nichrome wire, on a front side of the cover to heat the air as it flows through or near the cover 266.

Figure 3B:
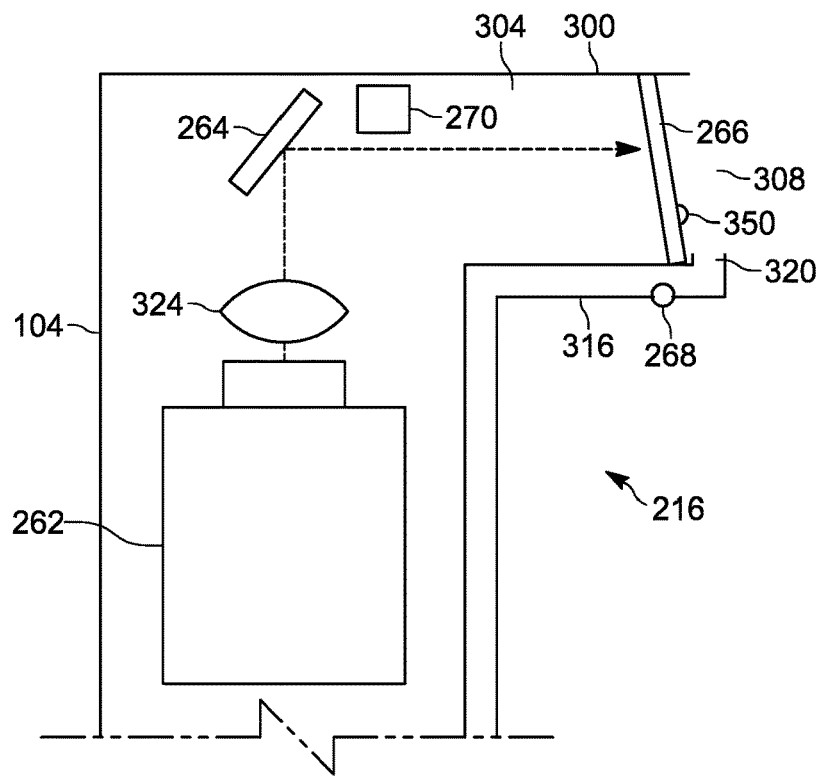
FIG. 3B is a side view of a label modification unit of the mobile automation apparatus having a closed cover in the system of FIG. 1.

FIG. 3B depicts a side view of the modification unit 216 including a heating wire 350 on a front side of the cover 266 in the closed position. In operation, air is supplied from a generator (not shown) via the conduit 316 to the outlet 320 and heated by the heating wire 350 for application to the rewriteable medium.

Also shown in FIG. 3A is an optical assembly 324 disposed in the cavity 304 in the path of the laser beam. The optical assembly 324 is controllable by the processor 250 to change the shape of the laser beam according to the required erasing or writing operation.

Figure 4:
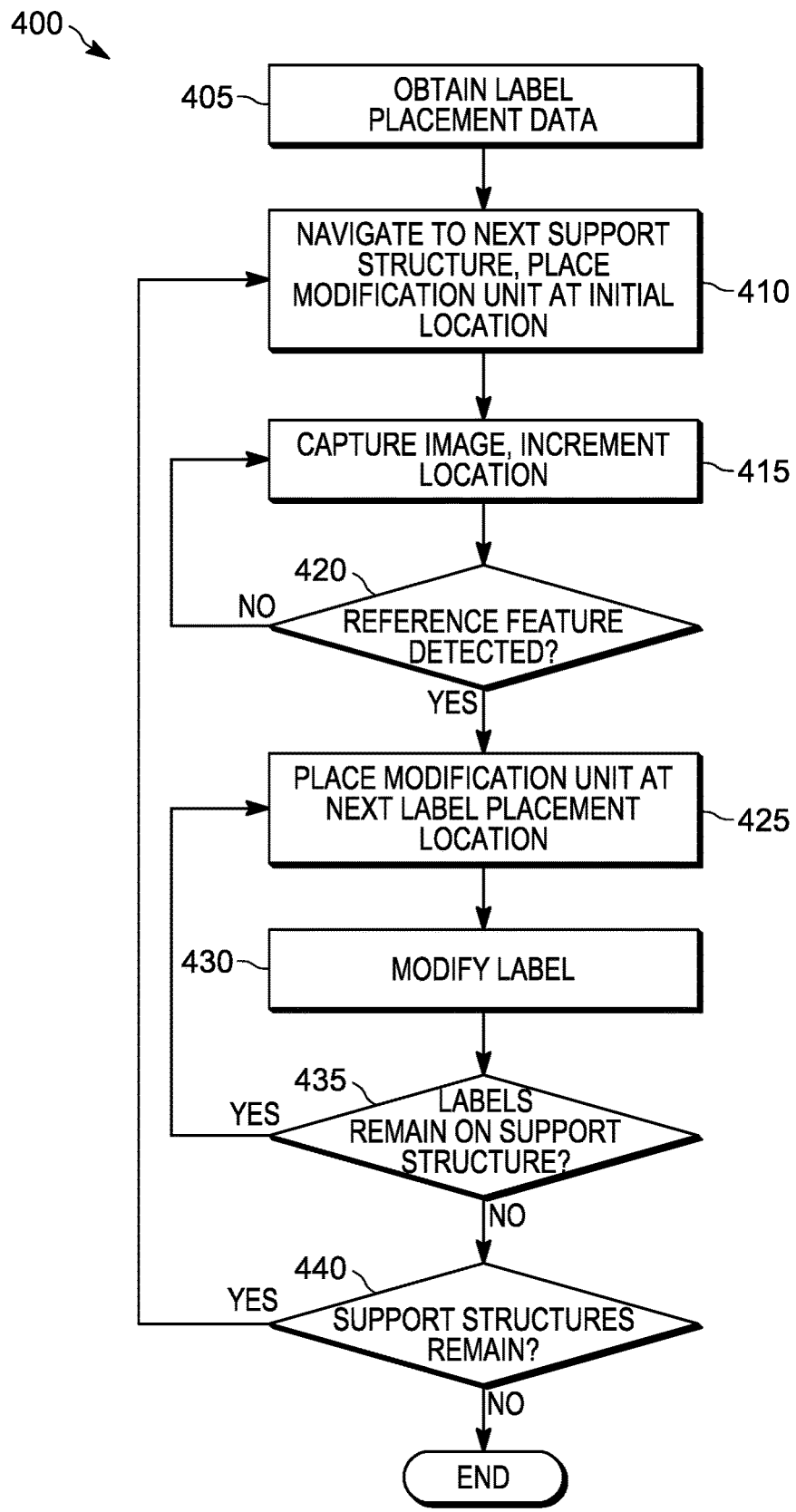
FIG. 4 is a flowchart of a method for labeling support structures.

The functionality of the apparatus 103, as implemented via execution of the application 258 by the processor 250 will now be described in greater detail, with reference to FIG. 4. FIG. 4 illustrates a method 400 of labeling support structures, which will be described in conjunction with its performance in the system 100, and in particular by the apparatus 103, with reference to the components illustrated in FIGS. 2A, 2B, 3A and 3B.

At block 405, the apparatus 103 is configured to obtain label modification data. The label modification data can be obtained from the server 101 over the link 107 or via the dock 108. In other examples, the label modification data can be received from the client device 105. The label modification data defines at least one location in the facility for performance of a label modification operation, such as modification of a label to replace previous label content at the location with new label content, writing of a label in a previously unlabeled location, or erasure of a previous label, without placement of a new label. In the present example, the locations are locations on the shelf edges 118 of the shelf modules 110. Further, in the present example, the locations are defined relative to a reference feature on the support structure. More specifically, each label modification location is defined as an offset distance along a shelf edge 118 of a shelf module 110. The offset distance is defined from a side of the module 110 (e.g. the leftmost side of the module 110, also referred to as the boundary of the module 110). In other examples, various other reference features can be employed to define the locations in the label modification data, such as machine-readable markers (e.g. physical features of the shelf, graphical indicators such as QR codes, or the like) along the shelf edges, ends of a shelf edge 118 within the boundaries of a module 110 (e.g. when a shelf edge 118 does not extend along the full length 119 of the module 110), and the like.

Figure 5:
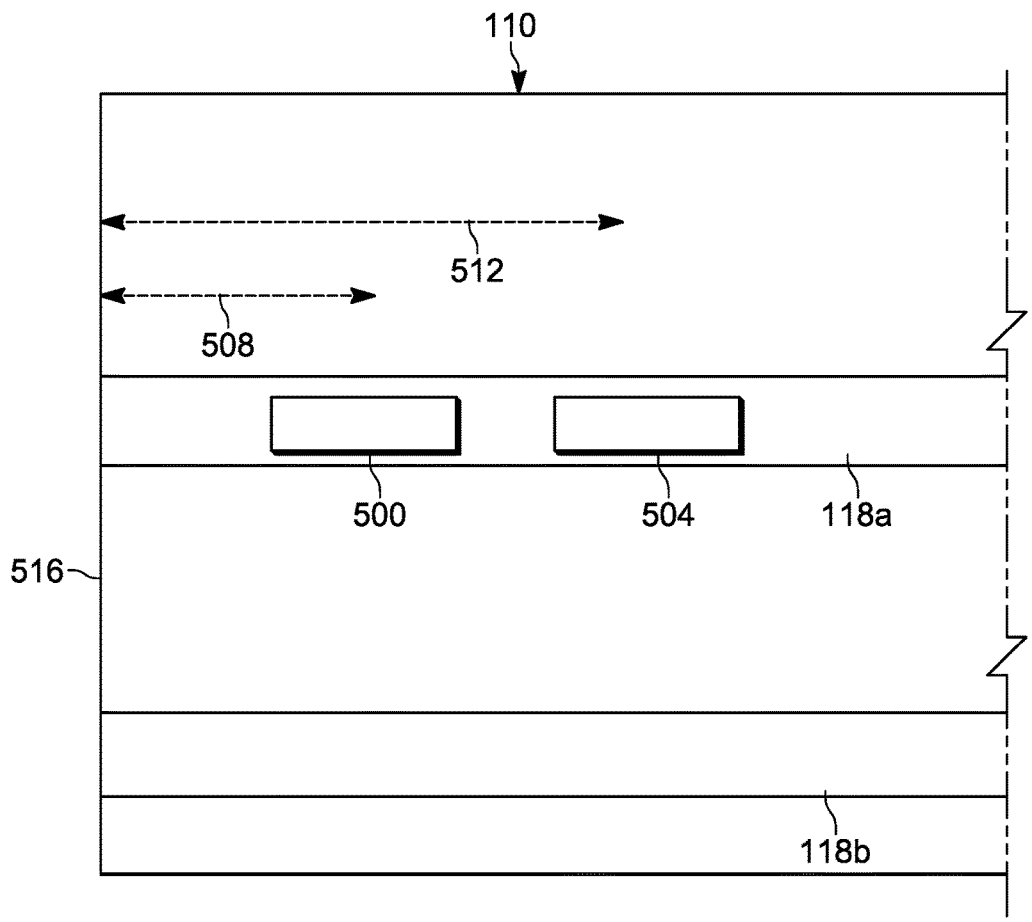
FIG. 5 illustrates a support structure bearing labels for modification through the method of FIG. 4.

Turning briefly to FIG. 5, a portion of an example shelf module 110 having upper and lower shelf edges 118a and 118b, respectively, is shown. The shelf edge 118a bears labels 500 and 504. The label 500 is at an offset 508 from a reference feature, in the form of a module boundary 516 (in the present example, the left side of the module 110), while the label 504 is at an offset 512 from the reference feature. The offsets 508 and 512, as well as indications of which shelf edge 118 the labels 500 and 504 are affixed to, can be stored in the repository 120 and obtained by the apparatus 103 at block 405, for storage in the repository 260. The label modification data obtained at block 405 therefore contains, in the present example, an identifier of a shelf module 110, an identifier of a shelf edge 118 of the identified module 110, and an offset distance along the identified shelf edge 118, from a predetermined reference feature of the identified module 110. The label modification data can also include label generation data, such as an image or other content for writing on rewriteable medium, or a product identifier permitting the apparatus 103 to retrieve or generate such label content. In some examples, the label modification data obtained at block 405 can also include an indication of the previous label to be modified (e.g. a product identifier or the like). Table 1, below, illustrates example label modification data obtained at block 405.

TABLE 1

Example Label Modification Data

| Module | Shelf edge | Offset (mm) | Label Format | Product ID |
|---|---|---|---|---|
| 110 | 118a | 150 | 1" × 3" | 765554 |
| 110 | 118a | 165 | 1" × 3" | 778633 |
| ... | ... | ... | ... | ... |

As shown above, for each label to be modified, a location is provided (defined by the module and shelf edge identifiers, as well as the offsets). Label generation data, in the example above, includes an identification of a label format, which may specify both the size of the label as above, and the arrangement of information on the label (not shown above). The product identifiers are employed by the apparatus 103 to retrieve information with which to populate the label format for generation of the label.

Returning to FIG. 4, at block 410 the apparatus 103 is configured to navigate to the next support structure (e.g. the next module 110) identified in the label modification data. Navigation is performed via a suitable navigational mechanism, such as via the use of the above-mentioned map, navigational sensors of the apparatus 103, and the like. In the present example, the apparatus 103 is configured to navigate to a predetermined location relative to the module 110. For example, modules 110 may have lengths of about 1.5 m (other module lengths are also contemplated, for example from about 1 m to about 2 m), and the effector assembly 104 may have a reach of about 1 m.

Figure 6A:
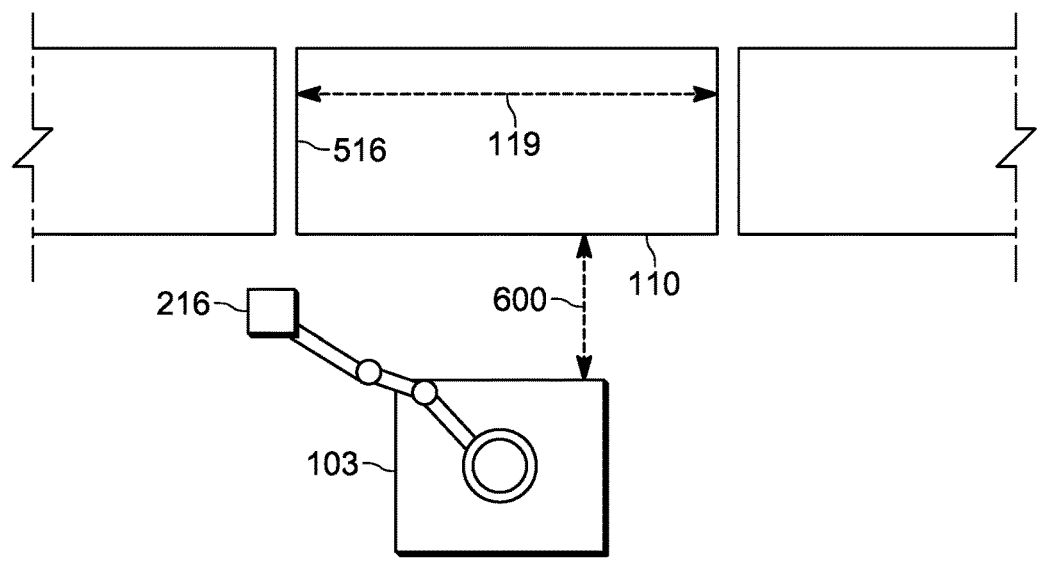
FIGS. 6A and 6B depict detection of support structure reference features during performance of the method of FIG. 4.

Thus, the apparatus 103 is configured to navigate to a position at a predefined depth relative to the module 110, approximately half-way along the length 119 of the module 110, from which the effector assembly 104 can reach any portion of the shelf edges 118 of the module 110. FIG. 6A illustrates such a position, with the apparatus 103 having arrived at a depth 600 relative to the module 110, about half-way along the length 119 of the module. As seen in FIG. 6A, the apparatus 103 is not exactly half-way along the length 119. As will be apparent to those skilled in the art, localization based on inertial sensing (e.g. via accelerometers and gyroscopes), as well as localization based on odometry (e.g. via a wheel encoder coupled to the locomotive mechanism 204) may suffer from navigational errors, and the internal localization maintained by the apparatus 103 may therefore not align exactly with the true position of the apparatus 103 within the environment.

Returning to FIG. 4, at block 410 the apparatus 103 is also configured to place the modification unit 216 at an initial location, from which detection of the above-mentioned reference feature will be initiated. Positioning of the modification unit 216 is achieved via control of the effector assembly 104, for example by issuing commands from the processor 250 to the effector assembly 104 specifying coordinates (e.g. X, Y, Z coordinates and roll, pitch and yaw angles) that define a position and orientation of the modification unit 216 relative to the chassis 200. The effector assembly 104 includes positional sensors (not shown) configured to track the position of the second end (i.e. the modification unit 216) of the effector assembly 104 relative to the first end 212, enabling the effector assembly 104 to position the modification unit 216 responsive to the above-mentioned commands from the processor 250.

The initial location is selected based on the known position (in the frame of reference 102) of the shelf edge 118 identified in the label modification data, as well as on the predetermined position to which the apparatus 103 navigated at block 410, and on a navigational error boundary. For example, the navigational error mentioned above may have been previously characterized as reaching a maximum of about 0.1 m. Further, the height of the apparatus 103 and of the first end 212 of the effector assembly 104 on the apparatus 103 are previously determined, as is the height of the shelf edge 118a identified in the label modification data shown above. In the present example, the reference feature is the boundary 516, and the apparatus 103 is therefore configured to control the effector assembly 104 to place the modification unit 216 at an initial location at the height of the shelf edge 118a, at a horizontal position adjacent to the boundary 516. As a result of the potential for a positional error of up to 0.1 m, the modification unit 216 may be placed at a distance parallel to the length 119 of about 0.85 m (half of the length 119 plus the maximum potential navigational error of 0.1 m).

At block 415 the apparatus 103 is configured to control the image sensor 270 to capture an image. As shown in FIG. 6A, the modification unit 216 is positioned to orient the image sensor 270 towards the module 110. The image captured at block 415 therefore depicts a portion of the shelf edge 118a identified in the label modification data. At block 420 the apparatus 103 is configured to determine whether the reference feature is detected in the image captured at block 415. When the determination is negative, the apparatus 103 is configured to repeat the performance of blocks 415 and 420, incrementing the location of the modification unit 216 along the shelf edge 118a for each image capture. In other words, in the present example, in which the labels (i.e. the rewritable media bearing the labels) are affixed to substantially horizontal shelf edges 118, each incremental movement of the modification unit 216 at block 415 maintains the modification unit 216 at a predetermined height (e.g. the height of the shelf edge 118a as specified in the repository 120, the repository 260, or the label modification data itself) and changes the horizontal location by a predetermined increment to shift the field of view of the image sensor 270.

Figure 6B:
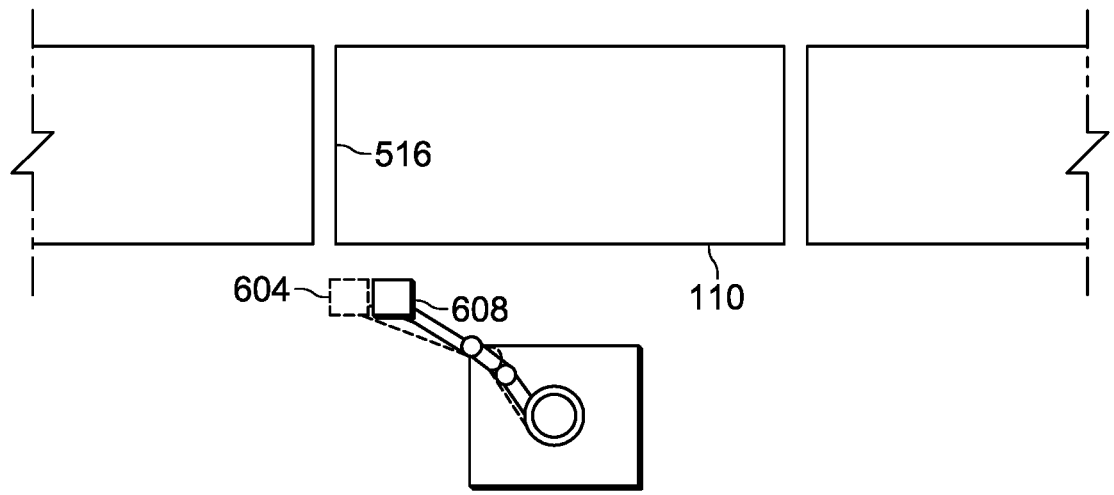

Referring to FIG. 6B, movement of the effector assembly 104 is illustrated, causing the modification unit 216 to traverse a portion of the shelf edge 118 from an initial position 604 (shown in FIG. 6A) to a further position 608.

Figure 6C:
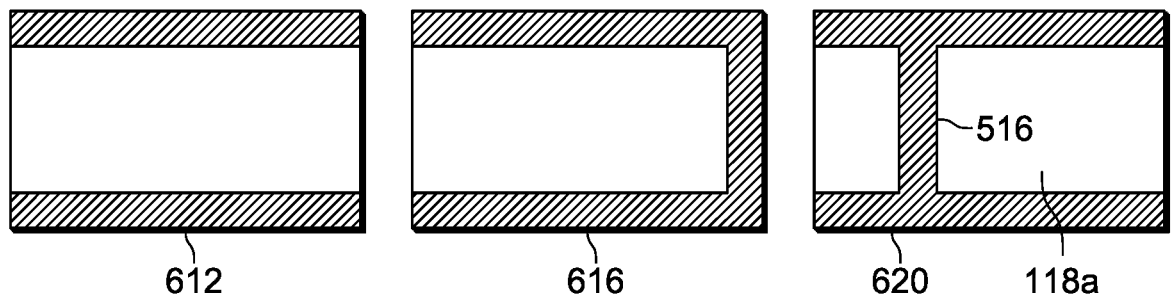
FIG. 6C illustrates example images captured during the detection process illustrated in FIGS. 6A and 6B.

FIG. 6C shows a sequence of three images 612, 616 and 620 captured during the traverse shown in FIG. 6B. The determination at block 420, in the present example, includes determining whether the image captured at block 415 contains a substantially vertical gradient change (e.g. from light, to dark, and back to light) indicative of a gap between modules 110 (which indicates the presence of the module boundary 516). The determination includes the application of a suitable gradient detection operation, edge detection operation or the like. In the example images of FIG. 6C, the image 612 depicts a shelf edge of an adjacent module 110, and does not contain the boundary 516. The image 616 contains a partial representation of the gap between modules 110, but does not contain the boundary 516 (e.g. does not contain the complete dark-light-dark transition mentioned above). The image 620, meanwhile, contains a dark-light-dark transition representing the boundary 516. Responsive to capturing the image 620, therefore, the determination at block 420 is affirmative and the performance of the method 400 proceeds to block 425.

As will now be understood by those skilled in the art, the position of the image sensor 270 is fixed relative to the position of the modification unit 216. The image sensor 270 need not be centered relative to the opening 308 or the operational portion 312, but the position of the image sensor 270 relative to the center of the opening 308 or the operational portion 312 is nevertheless predetermined. Therefore, the location of a reference feature in an image captured by the image sensor 270 indicates the position of the image sensor itself (and therefore the position of the modification unit 216) relative to the reference feature.

At block 425, the apparatus 103 is configured to control the effector assembly 104 to place the modification unit 216 at the next location defined in the label modification data. In other words, having established the position of the modification unit 216 relative to the reference feature following an affirmative determination at block 420, the apparatus 103 is configured to move the effector assembly 104 to place the modification unit 216 at the specified offset relative to the reference feature. Taking the label modification data of Table 1 as an example, at block 425 the effector assembly 104 is controlled to place the modification unit 150 mm to the right (in the orientation shown in FIGS. 5, 6A and 6B) of the boundary 516.

At block 430, the apparatus 103 is configured to modify a label at the location specified in the label modification data. The modification of a label at block 430 will be discussed in greater detail in connection with FIG. 7. At block 435, the apparatus 103 is configured to determine whether further labels remain to be modified on the current support structure (that is, the current module 110, to which the apparatus 103 navigated at block 410). The determination at block 435 is made with reference to the label modification data obtained at block 405. If all listed labels in the label modification data for the current module 110 have been modified, the determination at block 435 is negative. When the determination at block 435 is negative, the apparatus 103 proceeds to block 440. Otherwise, the apparatus 103 returns to block 425 to modify the next label for the current support structure.

At block 440, the apparatus 103 is configured to determine whether support structures other than the current support structure are identified in the label modification data and remain to be processed. In the example data shown in Table 1 above, only one module 110 is identified. In other examples, however, the label modification data can identify label modification locations on a plurality of distinct modules 110. When the determination at block 440 is affirmative, the apparatus 103 returns to block 410 to navigate to the next module 110 in the label modification data. As will now be apparent, during the performance of blocks 415 to 435, the apparatus 103 is configured to remain stationary relative to the current module 110. That is, although the effector assembly 104 and modification unit 216 move, the chassis 200 remains stationary relative to the module 110, thus mitigating or eliminating the accumulation of further navigational errors during the label modification process.

Figure 7:
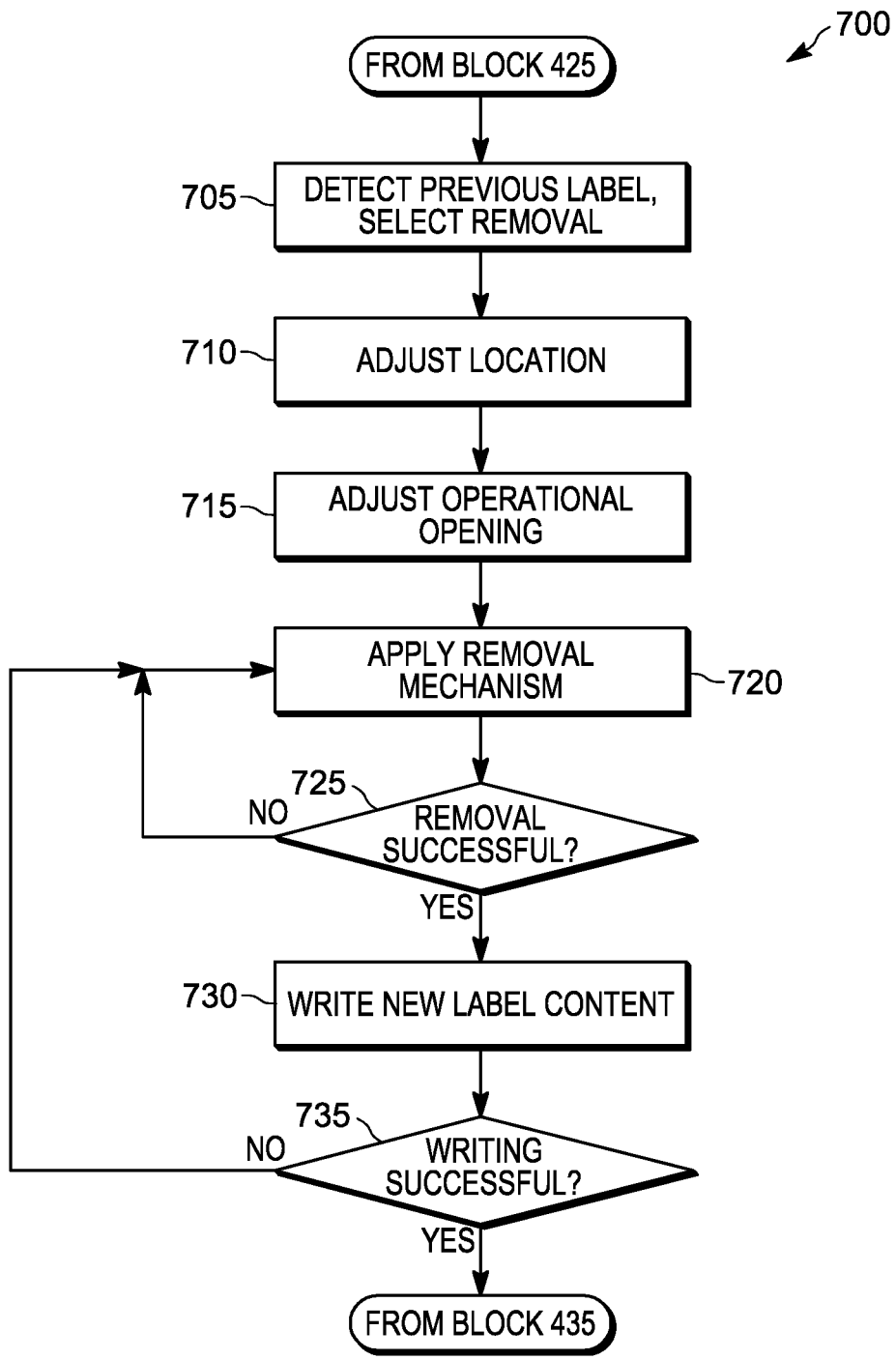
FIG. 7 is a flowchart of a method for label modification.

Turning now to FIG. 7, the performance of block 430 will be discussed in greater detail. FIG. 7 illustrates a method 700 of label modification which will be described in conjunction with its performance in the system 100, and in particular by the apparatus 103, with reference to the components illustrated in FIGS. 2A, 2B, and 3.

Figure 8A:
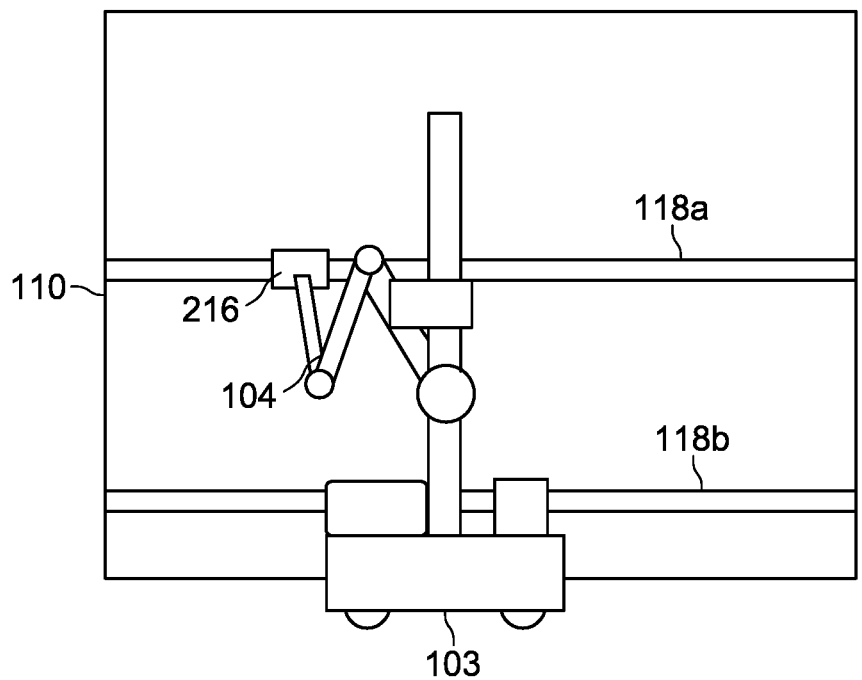
FIGS. 8A-8C illustrate previous label detection at block 705 of the method of FIG. 7.

At block 705, having controlled the effector assembly 104 to place the modification unit 216 at the next label modification location at block 425 as shown in FIG. 8A, the apparatus 103 is configured to detect the label at the label modification location. Detection of the label is achieved, in the present example, by controlling the image sensor 270 to capture one or more images of the shelf edge 118 from the current location of the modification unit 216 (i.e. the location specified in the label modification data or modification of a label). Label detection can be performed via the detection of a barcode or other label features such as strings of text in a captured image, the detection of one or more edge features (e.g. indicated by gradient changes or the like), or a combination of the above. For example, the label modification data or other data in the repository 260 can contain indications of label reference features and target positions for the label reference features. The target positions may be defined, for example, relative to the operational portion 312.

In some examples, the label reference features may be associated with the label, such as label features written as content on the rewriteable medium, or they may be associated with the rewriteable medium itself, such as a feature printed on or near an edge of the rewriteable medium, or a combination. In some examples, the label reference features may be printed in ultraviolet (UV) ink. The image sensor 270, therefore, may include a UV light source, and/or may have UV detection capabilities.

At block 705, the processor 250 can also be configured to select a removal mechanism for the previous label 804. The selection can be based on the label 804 and the label modification data. For example, the processor 250 may compare the previous label content with the new label content obtained from the label modification data and determine a difference value representing a quantity of modification required, for example as a function of laser erasing time, laser writing time, number of pixels of a bit map, or the like. If the difference value is below a threshold value, the processor 250 may select the laser 262 for erasing at least a portion of the previous label content. Otherwise, the processor 250 may select the hot air for erasing the entire contents of the previous label 804. In other examples, the label modification data or other data in the repository 260 can contain indications of suitable removal mechanisms for each label format, or for particular product identifiers. In other examples, such data is maintained in the repository 120, and the apparatus 103 transmits a request (e.g. containing the image 808 itself, or a product identifier decoded from the barcode on the label 804, or the like) for a removal mechanism to the server 101.

At block 710, the processor 250 is configured to adjust the location of the modification unit 216 based on the label or the label reference features detected at block 705.

For example, when a partial label is detected in an image captured at block 705, the processor 250 is configured to increment the location of the modification unit 216, for example to center the modification unit 216 over the partially detected label, or to position the detected label reference features to their target positions, and to then capture a further image via the image sensor 270 and repeat the detection. The processor 250 may process the captured image(s) and adjust the location of the modification unit 216 according to explicit predefined algorithms (e.g. if the label reference feature is too low, move the modification unit 216), based on neural network approaches, or a combination.

Figure 8B:
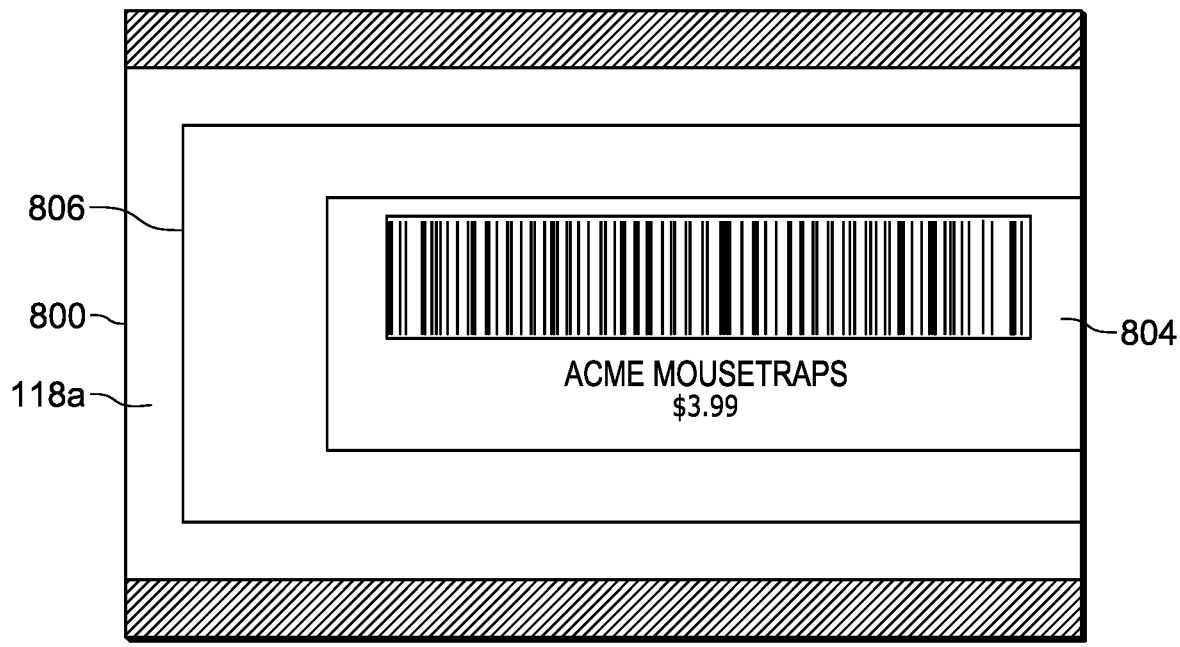
Figure 8C:
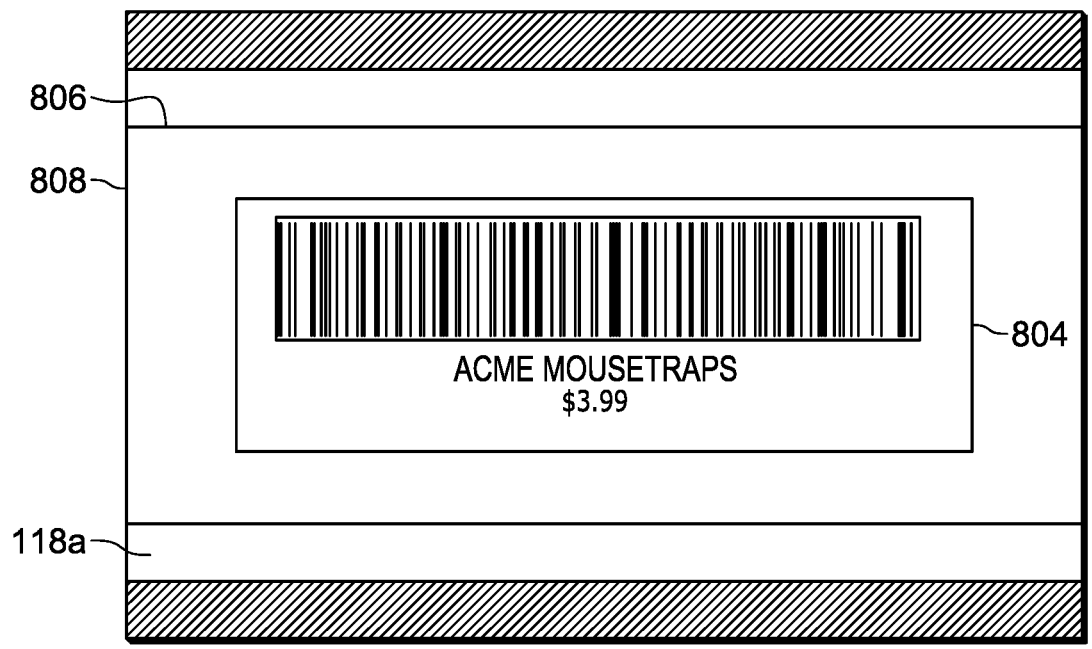

For example, referring to FIG. 8B, an example image 800 captured via the image sensor 270 is shown. The image 800 depicts a portion of the shelf edge 118a, and depicts a portion of a previous label 804 recorded on a rewriteable medium 806 supported on the shelf edge 118a. The partial detection of the previous label 804 may indicate that the previous label 804 was not written on the rewriteable medium 806 at exactly the specified location. The processor 250 can be configured to control the effector assembly 104 to move the modification unit 216 along the shelf edge 118a in the direction of the partially detected label 804 and to capture a further image. A further image 808 is shown in FIG. 8C, in which the previous label 804 is fully visible. The processor 250, in other words, detects the previous label 804 as being coincident with the current position of the modification unit 216 and therefore suitable for modification. The processor 250 can also be configured to compare the detected label (e.g. a product identifier decoded from a barcode) to previous label data included in the label modification data. When the previous label 804 does not match the expected previous label, the processor can be configured to store an error message in the memory 254.

Figure 9A:
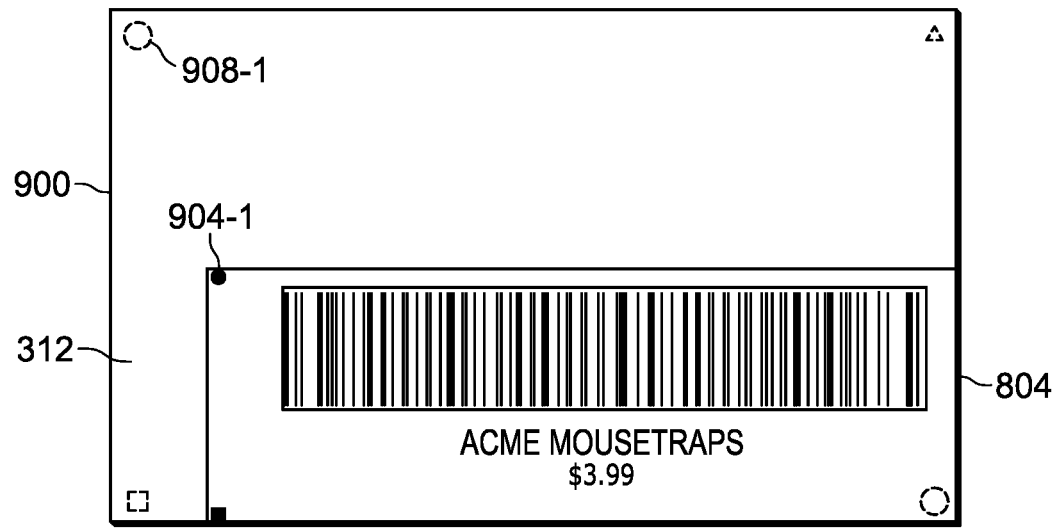
FIG. 9A-9C illustrate previous label positioning at block 715 of the method of FIG. 7.
Figure 9B:
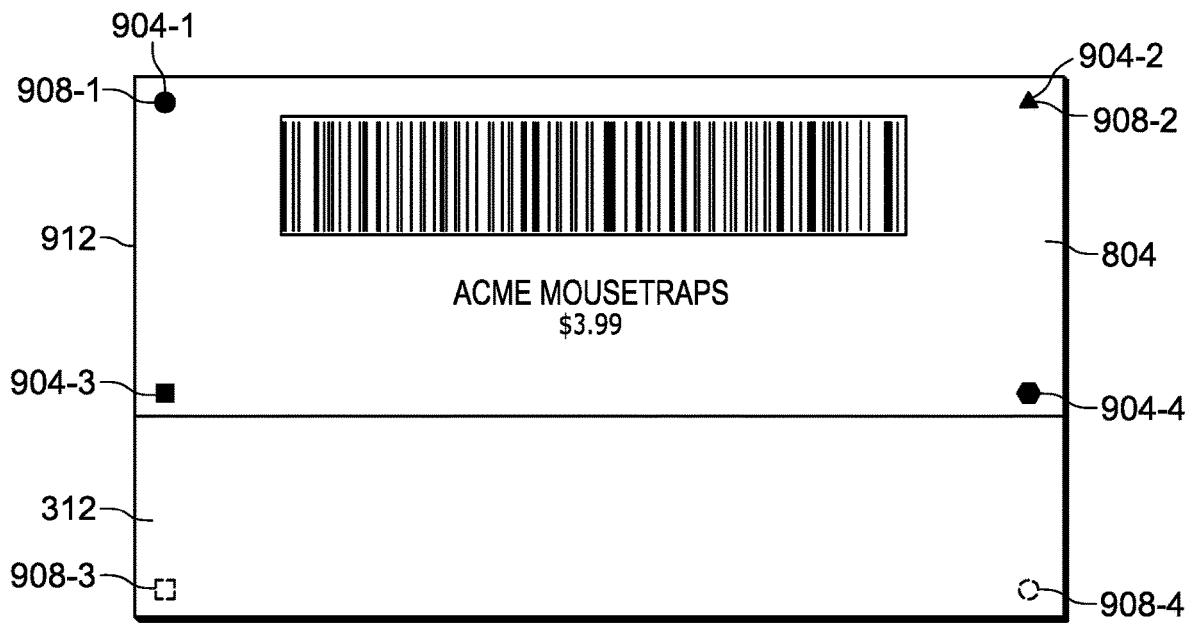

Referring to FIG. 9A, an example image 900 captured via the image sensor 270 is shown. The image 900 depicts a portion of the label 804 visible through the operational portion 312. The label 804 includes a label reference feature 904-1 having a target position 908-1. The processor 250 is configured to control the effector assembly 104 to move the modification unit 216 vertically and laterally to position the label reference feature 904-1 at the target position 908-1. A further image 912 is shown in FIG. 9B, in which the label reference features 904-1 and 904-2 are at their respective target positions 908-1 and 908-2. Further label reference features 904-3 and 904-4 are also visible in the operational portion 312.

The processor 250 can also extend the modification 216 towards the shelf edge 118. Extension of the modification unit 216 is performed to bring the front of the modification unit 216 near or into contact with one or both of the shelf edge 118a and the rewriteable medium 806. Extension of the modification unit 216 can also serve to effectively increase the size of the label relative to the opening 308, and more particularly the operational portion 312 of the modification unit. The processor 250 can control the effector assembly 104 to extend the modification unit 216 towards the shelf edge 118a until, for example, the label reference features are at their target positions. In other examples, the processor 250 can control the effector assembly 104 to extend the modification unit 216 towards the shelf edge 118a until one or more sensors (e.g. strain gauges or the like) in the effector assembly 104 register a threshold resistance indicating that the modification unit 216 has contacted the shelf edge 118a.

Returning to FIG. 7, at block 715, the processor 250 is configured to adjust the size of the operational portion 312. For example, the processor 250 is configured to further detect the operational portion 312. Detection of the operational portion 312 is achieved, in the present example, by controlling the image sensor 270 to capture one or more images and process the captured image(s) to detect one or more edge features (e.g. indicated by gradient changes or the like) of the housing 300 and the cover(s) 266 defining the operational portion 312.

When the operational portion 312 is detected as being too large for the label, the processor 250 is configured to incrementally control the cover(s) 266 to partially block the opening 308, thereby resizing the operational portion 312. The processor 250 then captures a further image via the image sensor 270 and repeats the detection. The processor 250 is then configured to redefine the target positions 908 based on the operational portion 312. Resizing the operational portion 312 therefore allows the target positions 908 to be adjusted.

Figure 9C:
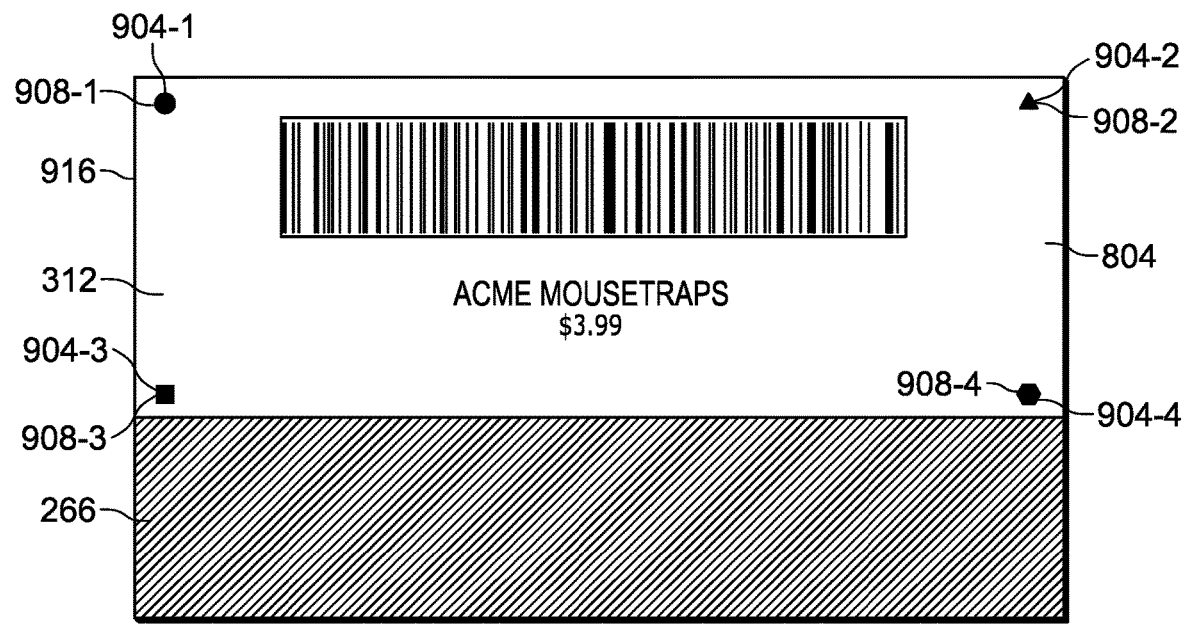

Referring to FIGS. 9A-9C, the processor 250 can, for example, be configured to adjust the location of the modification unit 216 from an initial position, as shown in FIG. 9A in accordance with block 710 until two label reference features 904-1 and 904-2 are at their target positions 908-1 and 908-2, as shown in FIG. 9B. The processor 250 can then be configured to proceed to block 715 to move the cover 266 resize the operational portion 312 to adjust the target positions 908-3 and 908-4 to coincide with their respective label reference features 904-3 and 904-4, as shown in FIG. 9C.

Returning to FIG. 7, at block 720, the processor 250 is configured to apply the selected removal mechanism. In the present example, the selected removal mechanism is laser erasing, hence the processor 250 is configured to control the laser 262 to emit a laser beam at the second power level to heat the rewriteable medium to the first threshold temperature to erase the content on the rewriteable medium. The processor 250 is further configured to control the steering mechanism 264 and the optical assembly 324 to control the shape of the laser beam (e.g. change the focus to create a larger spot) and steer the laser beam to portions of the rewriteable medium that need to be erased, as specified by the label modification data. To ensure that the operational portion 312 remains filled (i.e. that the apparatus 103 does not move, for example from being bumped) while the laser 262 is erasing the label 804, the processor 250 can control the image sensor 270 to periodically or continuously capture images and process the captured images to verify that the label reference features 904 are maintained at their target positions 908. If a label reference feature is not detected at its target position, the processor 250 is configured to disable the laser 262.

In another example, the removal mechanism may be hot air, hence the processor 250 can be configured to control the hot air supply to emit hot air into the conduit 316 for emission onto the rewriteable medium. The processor 250 can further control the cover 266 to the closed position to protect components of the modification unit 216 disposed in the cavity 304, and to utilize the cover 266 to diffuse airflow of the hot air across the rewriteable medium, for example by use of ridges or a hollow interior of the cover 266. In some examples, the processor 250 can control the effector assembly 104 to move the modification unit 216 and the conduit 316 across the rewriteable medium. The hot air is applied to the rewriteable medium for a predetermined period of time, or until the temperature sensor 268 indicates that the hot air has reached a predetermined temperature. For example, at a temperature of about 170° C., the hot air is expected to have heated the rewriteable medium to a temperature of about 130° C. to about 170° C. to erase the label content.

At block 725, the processor 250 is configured to determine whether the erasing operation was successful. More particularly, the processor 250 can be configured to control the cover 266 to the open position (e.g. when the cover 266 is in the closed position for a hot air erasing operation) and to control the image sensor to capture one or more images. The captured images are processed to determine whether any content from the previous label 804 remains. When the determination at block 725 is negative, the apparatus 103 is configured to repeat the performance of block 720. When the determination at block 725 is affirmative, the processor 250 is configured to proceed to block 730.

At block 730, the processor 250 is configured to then control the laser 262 to emit a laser beam at the first power level to heat the rewriteable medium to the first threshold temperature to write content on the rewriteable medium. The processor 250 is further configured to control the steering mechanism 264 to steer the laser beam to portions of the rewriteable medium that need to be written. The steering mechanism 264 may use for example vector movement (e.g. when the content is defined by format statements, e.g. defining vertices, lines or the like) or rasterization (e.g. when the content is defined by bit maps) to steer the laser beam. As with erasing, to ensure that the operational portion 312 remains filled (i.e. that the apparatus 103 does not move, for example from being bumped) while the laser 262 is writing content to the rewriteable medium, the processor 250 can control the image sensor 270 to periodically or continuously capture images and process the captured images to verify that the label reference features are maintained at their target positions. The processor 250 can be further configured to disable the laser 262 if a label reference feature is not detected at its target position.

Figure 10A:
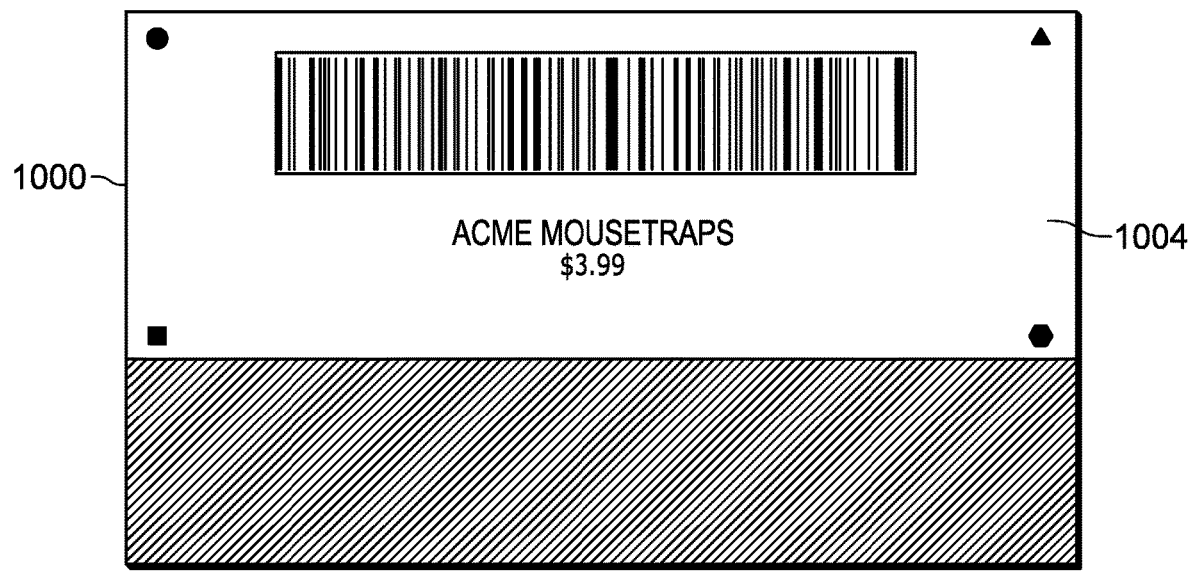
FIGS. 10A-10C illustrate selective erasing and writing operations at blocks 720 and 730 of the method of FIG. 7.
Figure 10B:
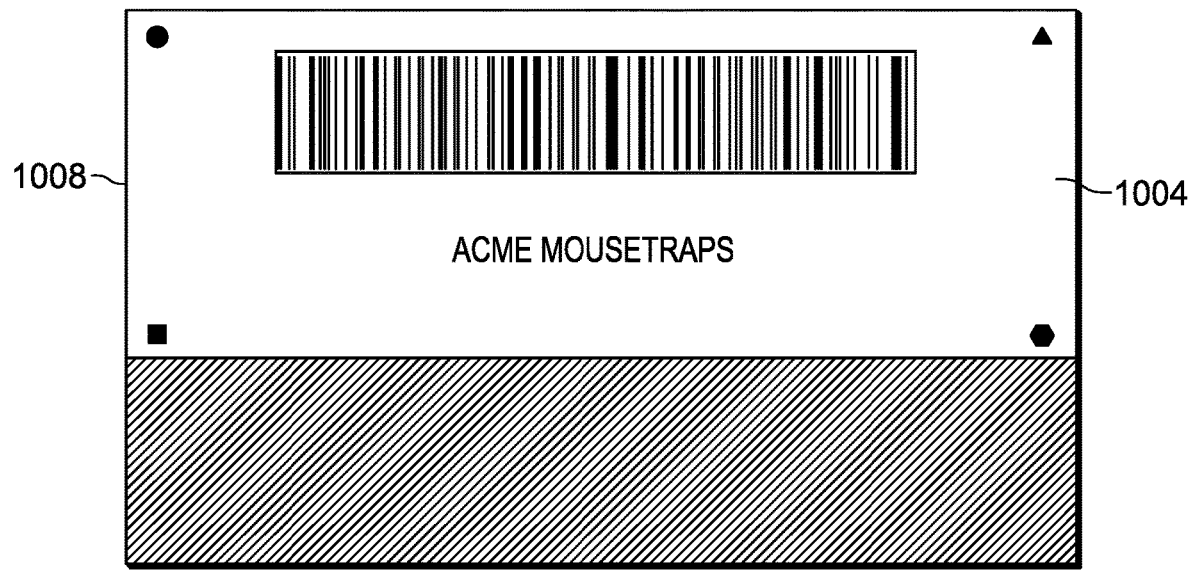
Figure 10C:
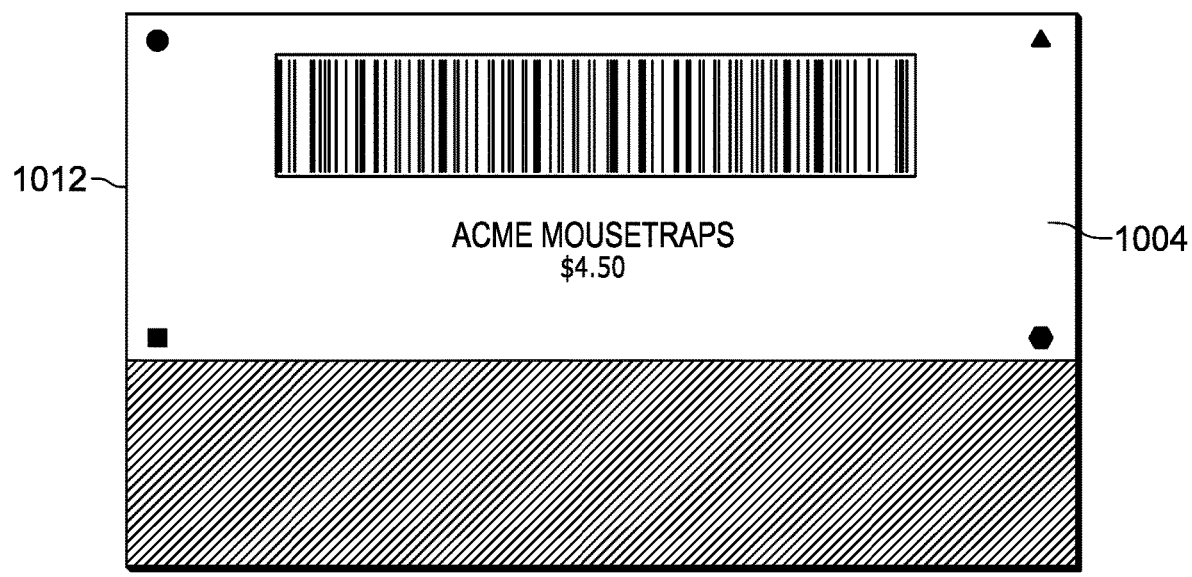

Referring to FIG. 10A, an example image 1000 depicting a label 1004 is shown. In the present example, the label modification data can specify a price update for the label 1004. The processor 250 is configured, in the present example, to select at block 705, the laser 262 as the selected removal mechanism based on the amount of modification required. Having located the label 1004 and adjusted the location of the modification unit 216, at block 720, the processor 250 can be configured to locate the price portion, for example, by referencing the arrangement of label content specified in the label modification data stored in the repository 120. The processor 250 can then control the laser 262, the steering mechanism 264, and the optical assembly 324 to selectively erase the price portion. FIG. 10B depicts an example image 1008 depicting the label 1004 having the price selectively erased. Having selectively erased the price portion of the label 1004, the processor 250 is configured to proceed to block 730. The processor 250 can control the laser 262, the steering mechanism 264, and the optical assembly 324 to selectively write the new price portion on the label 1004. FIG. 10C depicts an example image 1012 depicting the label 1004 having the new price written thereon.

As will now be apparent, when no previous label is detected at block 705 (e.g. when no partial detection is registered after a threshold number of incremental movements of the modification unit 216), the performance of the method 700 can skip from block 705 directly to block 730. In other examples, when the label modification data specifies only erasure, the method 700 can stop after block 725.

At block 735, the processor 250 is configured to determine whether the new label was successfully written at block 730. For example, the processor 250 can be configured to retract the modification unit 216 from the shelf edge 118a and control the image sensor 270 to capture an image of the shelf edge 118a. The captured image is processed to determine whether all the content of the new label was successfully written. For example, the processor 250 may detect a barcode, a product identifier and/or the price to verify the values match those specified in the label modification data. When the determination is affirmative, the apparatus 103 returns to block 435 of the method 400. When the determination is negative, the apparatus 103 is configured to repeat block 720.

Variations to the above systems and methods are contemplated. For example, in some embodiments, the performance of block 410 of the method 400 includes only placement of the modification unit 216 at an initial location, without navigating to a support structure. In such embodiments, the apparatus 103 may lack a controllable locomotive mechanism, and may instead be moved to the support structure by an operator. Following arrival at the support structure, the operator may activate an input on the apparatus 103 to initiate the performance of block 410 (that is, the control of the modification unit 216).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An apparatus for labeling support structures, comprising:
   a chassis having a locomotive assembly;
   an effector assembly having a first end coupled to the chassis and a second end movable relative to the chassis;
   a label modification unit at the second end of the effector assembly, the label modification unit including an image sensor;
   a controller coupled to the locomotive assembly, the effector assembly and the label modification unit, the controller configured to:
      obtain label modification data defining a location relative to a reference feature on a support structure for a label modification operation;
      control the locomotive assembly to travel to the support structure;
      detect the reference feature via image data captured at the image sensor;
      control the effector assembly to place the label modification unit at the location relative to the reference feature; and
      control the effector assembly and the label modification unit to perform the label modification operation, wherein the label modification operation comprises at least one of: (i) erasing previous label content from a rewriteable medium, and (ii) writing new label content to the rewriteable medium; and
   a hot air supply configured to supply hot air for application via an outlet of the label modification unit wherein the controller is configured to erase the previous label content by controlling the hot air supply to apply the hot air to the rewriteable medium.

2. The apparatus of claim 1, wherein the effector assembly is a robotic arm.

3. The apparatus of claim 2, further comprising a mast extending upwards from the chassis; wherein the robotic arm is supported at the first end on the mast.

4. The apparatus of claim 1, wherein the label modification operation comprises writing the new label content to the rewriteable medium responsive to erasing the previous label content from the rewriteable medium.

5. The apparatus of claim 1, wherein the label modification unit includes a laser configured to emit a laser beam in a direction towards the rewriteable medium; wherein the controller is configured to write the new label content by controlling the laser to heat the rewriteable medium to a first threshold temperature.

6. The apparatus of claim 5, wherein the controller is further configured to erase the previous label content by controlling the laser to heat the rewriteable medium to a second threshold temperature.

7. The apparatus of claim 5, wherein the label modification unit includes a housing configured to house the laser, the housing defining a cavity and an opening through which the laser beam is directed.

8. The apparatus of claim 7, wherein the label modification unit further includes a cover configured to selectively block the opening.

9. The apparatus of claim 1, wherein the support structure includes a shelf module including a label-bearing shelf edge; and wherein the reference feature is a boundary of the shelf module; and
   wherein the controller is configured to detect the reference feature by:
      controlling the effector assembly to position the label modification unit at an initial location relative to the shelf module;
      capturing, via the image sensor, an image of the shelf module; and
      detecting the module boundary in the image.

10. The apparatus of claim 9, wherein the controller is further configured to detect the module boundary in the image by detecting a sequence of gradient changes in the image.

11. The apparatus of claim 6, wherein the previous label content comprises a portion of content recorded on the rewriteable medium.

12. The apparatus of claim 8, further comprising a hot air supply configured to supply hot air for application via an outlet of the label modification unit, the hot air supply including a heating element on a front side of the cover; and wherein the controller is configured to erase the previous label content by controlling the hot air supply to heat the air via the heating element and apply the hot air to the rewriteable medium.

* * * * *